United States Patent
Hatlewick et al.

(10) Patent No.: US 9,969,907 B2
(45) Date of Patent: May 15, 2018

(54) CONTROLLED PEEL LAMINATE ADHESIVE FILMS

(75) Inventors: Julie R. Hatlewick, Saginaw, MI (US); Robert L. McGee, Midland, MI (US); Stephen J. Skapik, III, Columbus, OH (US); Sarah K. Gassner, Freeland, MI (US)

(73) Assignee: Dow Global Technologies LLC, Midland, MI (US)

( * ) Notice: Subject to any disclaimer, the term of this patent is extended or adjusted under 35 U.S.C. 154(b) by 204 days.

(21) Appl. No.: 14/346,770

(22) PCT Filed: Sep. 6, 2012

(86) PCT No.: PCT/US2012/053904
§ 371 (c)(1),
(2), (4) Date: Mar. 24, 2014

(87) PCT Pub. No.: WO2013/048689
PCT Pub. Date: Apr. 4, 2013

(65) Prior Publication Data
US 2014/0262426 A1 Sep. 18, 2014

Related U.S. Application Data

(60) Provisional application No. 61/541,145, filed on Sep. 30, 2011.

(51) Int. Cl.
| | | |
|---|---|---|
| C09J 7/29 | (2018.01) | |
| C09J 7/02 | (2006.01) | |
| B32B 7/06 | (2006.01) | |
| B32B 15/08 | (2006.01) | |
| B32B 27/08 | (2006.01) | |
| B32B 27/32 | (2006.01) | |
| B32B 1/08 | (2006.01) | |
| H01B 7/02 | (2006.01) | |
| H01B 7/18 | (2006.01) | |

(52) U.S. Cl.
CPC .............. *C09J 7/0203* (2013.01); *B32B 1/08* (2013.01); *B32B 7/06* (2013.01); *B32B 15/08* (2013.01); *B32B 27/08* (2013.01); *B32B 27/32* (2013.01); *C09J 7/0296* (2013.01); *C09J 7/29* (2018.01); *C09J 7/35* (2018.01); *H01B 7/02* (2013.01); *H01B 7/188* (2013.01); *B32B 2405/00* (2013.01); *C09J 2201/128* (2013.01); *C09J 2201/162* (2013.01); *C09J 2203/302* (2013.01); *C09J 2423/04* (2013.01); *C09J 2423/046* (2013.01); *C09J 2423/106* (2013.01); *C09J 2433/00* (2013.01); *Y10T 428/2804* (2015.01); *Y10T 428/2848* (2015.01)

(58) Field of Classification Search
CPC ......... B32B 15/08; B32B 27/08; B32B 27/32; H01B 7/221; H01B 7/226; H01B 9/022; H01B 9/023; H01B 11/1826; H01B 11/183; H01B 7/188; C09J 2203/302; C09J 7/0292
See application file for complete search history.

(56) References Cited

U.S. PATENT DOCUMENTS

| | | | |
|---|---|---|---|
| 3,233,036 A | 2/1966 | Jachimowicz | |
| 3,379,821 A | 4/1968 | Garner | |
| 3,424,631 A | 1/1969 | Peacock | |
| 3,770,570 A | 11/1973 | Swearingen et al. | |
| 3,795,540 A | 3/1974 | Miller | |
| 3,876,462 A | 4/1975 | Carini et al. | |
| 3,891,791 A | 6/1975 | Schmidt | |
| 3,950,605 A | 4/1976 | Hori et al. | |
| 4,125,739 A | 11/1978 | Bow | |
| 4,731,504 A | 3/1988 | Achille et al. | |
| 4,767,894 A | 8/1988 | Schombourg | |
| 5,550,252 A | 8/1996 | Vanmaele | |
| 5,783,638 A | 7/1998 | Lai et al. | |
| 5,882,789 A * | 3/1999 | Jones | B32B 7/06 428/34.8 |
| 6,634,389 B2 | 10/2003 | Noone et al. | |
| 6,770,820 B2 * | 8/2004 | Sakurai | C09J 9/02 174/117 A |
| 7,022,918 B2 | 4/2006 | Gialenios et al. | |
| 7,939,169 B2 * | 5/2011 | McGee | B32B 7/12 156/60 |
| 2007/0082155 A1 * | 4/2007 | Rehkugler | B32B 27/08 428/35.7 |
| 2009/0208765 A1 * | 8/2009 | McGee | B32B 7/12 428/482 |
| 2010/0288528 A1 * | 11/2010 | Houston | H01L 311/1895 174/102 R |
| 2011/0011639 A1 * | 1/2011 | Visser | H01B 11/1008 174/350 |

FOREIGN PATENT DOCUMENTS

| | | |
|---|---|---|
| EP | 1848006 A2 | 10/2007 |
| JP | S54-055046 A | 5/1979 |

(Continued)

OTHER PUBLICATIONS

Machine Translation of EP 1,848,006 A2 (2007).*

(Continued)

*Primary Examiner* — Scott R Walshon

(57) ABSTRACT

A multilayer adhesive film comprising surface adhesive layers, an internal Controlled Bond Layer ("CBL") comprising a propylene-based polymer strippably adhered to an adjacent layer; an internal Strong Bond Layer ("SBL") different than the CBL having a facial surface in adhering contact to the CBL and; optionally, one or more different internal Filler Layer(s) located between the SBL and the adhesive surface layer on the side of the SBL opposite to the adhered CBL. In preferred embodiments the adhesive comprises an ethylene/ethylenically unsaturated carboxylic acid copolymer. The adhesive films are used in cable shielding structures.

12 Claims, No Drawings

(56) References Cited

FOREIGN PATENT DOCUMENTS

| JP | H04-329131 A | 11/1992 |
| JP | H09-267433 A | 10/1997 |
| JP | 2001-006446 A | 1/2001 |
| WO | WO-2001/036831 A1 | 5/2001 |

OTHER PUBLICATIONS

Thomas I. Butler and Earl W. Veazey, TAPPI Press, 1992, chapter 3.
PCT/US2012/053904 International Search Report and Written Opinion of the International Searching Authority dated Mar. 28, 2013.
PCT/US2012/053904, International Preliminary Report on Patentability, dated Apr. 1, 2014.

\* cited by examiner

CONTROLLED PEEL LAMINATE ADHESIVE FILMS

BACKGROUND OF THE INVENTION

This invention relates to a multilayer heat activated adhesive film with improved control of its peel properties. The invention also relates to cable jacketing or shielding structures that use such films.

It is well known to use adhesive films in cable shielding structures having internal metal layers requiring adhesion to outer coverings of a plastic protective layer; such as in coaxial, fiber optic, electrical power and other communications cables.

In general such films are intended to tightly adhere the outer plastic jacket or coating to the inner metallic surface or layer. In the general process for preparing a shielding laminate structure and use in a coated or jacketed cable, an adhesive film is first laminated on one side of thin gauge metal, e.g., steel, by: (a) preheating the metal, (b) contacting the film to the metal, (c) further heating to increase the bond strength, (d) cooling and (e) winding onto a roll. This film-coated metal sheet or strip is sometimes referred to as "shielding tape". This laminate, in appropriate widths, is subsequently formed into tubes, often corrugated tubes, which have conductive member(s), e.g., wiring or fiber optic cables, in the center of the tubes with the laminated adhesive film on the outside of the tube. Then, a thermoplastic polymer jacketing or coating (often HDPE) is extruded over the tubing and the heat from the polymer creates a bond between the jacketing and the film. The adhesive film inter-layer bonds and bonds to the metal and outer jacketing are desired to withstand delamination under conditions of normal production, installation and use but also allow the outer plastic jacket material to be easily and consistently peeled back from the central metal encased conductive member(s), and removed to facilitate the grounding, splicing and other procedures that may need to access the metallic layer and/or the central conductive member(s). The peeling and removal is preferably performed or performable by hand or arm force, which corresponds to having a peel strength or bond strength on the order of less than about. When the outer plastic jacket material is peeled back away from the metal, the film needs to be sufficiently adhered to the metal and structured such that, interlayer delamination during outer jacket removal leaves a sufficiently thick, residual protective coating tightly adhered to the metal at all times for protection against corrosion following the removal of the jacket.

U.S. Pat. No. 4,125,739 discloses a two layer film or a three layer film where an adhesive layer bonds strongly to the metal sheathing. In the two layer film, the other layer has a strippable bond to the cable jacketing. For the 3 layer film, the outside layer bonds strongly to the cable jacketing material, and the core layer is strippable from either adhesive layer.

U.S. Pat. No. 4,767,894 A discloses an annular cable coating having at least three extruded layers around a conductor. The intermediate layer between first and second layers is strippably bonded to the first layer and fully bonded to the second layer such that the second layer together with substantially all of the intermediate layer is readily strippable from the first layer. In particular, it relates to an insulated electrical cable in which such laminate construction coextruded substantially coaxially around a core conductor and not provided in the form a film.

BRIEF SUMMARY OF THE INVENTION

The present invention includes a multilayer adhesive film comprising:

A. as surface adhesive layers, Adhesion Layer 1 ("AL1") and Adhesion Layer 2 ("AL2");
B. an internal Controlled Bond Layer ("CBL") strippably adhered to an adjacent layer and comprising a propylene-based polymer;
C. an internal Strong Bond Layer ("SBL") different than the CBL and having a facial surface in adhering contact to the CBL and;
D. optionally, one or more different internal Filler Layer(s) located between the SBL and the adhesive surface layer on the side of the SBL opposite to the adhered CBL; wherein such adhesive film is: (i) having a bond strength between the CBL and a non-CBL layer adjacent thereto that is less than the heat activated adhesive bond strengths of the surface layers to surfaces of metal or thermoplastic ethylene polymer and the other bond strengths between other layers in the film, (ii) comprising at least about three weight percent recycled film composition in either the SBL or a Filler Layer and, (iii) when adhering a thermoplastic ethylene polymer surface to a metal surface, providing a strippable interface at the CBL.

In another aspect, in the multilayer film the Bond strength of AL1 and/or AL2 to chrome coated steel is at least 20 lbf/in width (3.5 N/mm). In other alternative aspects, in the multilayer film: the bond strength of CBL to an adjacent adhesive layer is from 8 to 10 lbf/in width (1.4-1.75 N/mm); the AL1 comprises at least 40 weight percent of an ethylene/ $\alpha,\beta$-ethylenically unsaturated carboxylic acid copolymer; the Controlled Bond Layer ("CBL") is comprising at least about 30 weight percent of a propylene-based polymer; or the Strong Bond Layer ("SBL") is comprising at least about 50 weight percent of an ethylene-based interpolymer.

In a further alternative embodiment, in the multilayer adhesive film: the layer structure is represented by ABCDE where the layers are: A. AL1; B. CBL which is strippably adhered to AL1; C. SBL having a facial surface in adhering contact to CBL; D. optionally, one or more different internal Filler Layer(s) located between SBL and AL2; and E. AL2. A further alternative aspect of the invention is a laminate comprising a metal layer, a multilayer film according to the invention and a thermoplastic ethylene polymer layer, wherein surface AL2 is directly adhered to a metal layer. Further embodiments of the multilayer films according to the invention comprise: from 15 to 25 volume percent AL1, from 5 to 15 volume percent CBL, from 30 to 40 volume percent SBL, from 15 to 25 volume percent Filler Layers, and from 10 to 20 volume percent AL2. Other embodiments include a multilayer film wherein the ethylene/$\alpha,\beta$-ethylenically unsaturated carboxylic acid copolymer is an ethylene/acrylic acid copolymer that has an acid comonomer content within a range of from 3 to 9 weight percent, based upon copolymer weight.

Also discussed below are laminate cable structure embodiments comprising a core of at least one insulated conductive member, a circumferential located surrounding metal sheet layer, a next circumferential located surrounding layer of a adhesive film as disclosed herein, a next circumferential located surrounding layer of an outer thermoplastic ethylene polymer jacket; wherein the adhesive film layer strippably adheres the outer thermoplastic ethylene polymer jacket layer to the metal sheet layer and/or wherein said metal sheet is selected from the group consisting of electrolytically chrome coated steel, aluminum, copper, bronze, tin-free steel, tin-plate steel and copper-clad stainless steel.

In the commercial scale production of the films for these types of applications, it is also important to be able to incorporate back into the film limited amounts of the recycled edges, scrap or other off-spec materials that inevitably result and would otherwise be wasted or detrimentally affect the film performance.

Polymer Descriptions and Terms

"Compositions" and like terms mean mixtures of two or more materials, such as polymers which are blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. The components of a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/α-olefin polymer" and "propylene/α-olefin polymer" are indicative of interpolymers as described below. It is noted that although a polymer is often referred to as being "made of" monomer(s), "based on" a specified monomer or monomer type, "containing" a specified monomer content, or the like, this is obviously understood to be referring to the fact that the polymer is made up from and contains the polymerized remnant of the specified monomer and not the unpolymerized monomer species. Polymers and blends or compositions comprising them are often also referred to as "resins".

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

DETAILED DESCRIPTION OF THE INVENTION

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene/α-olefin copolymers, propylene/α-olefin copolymers, etc.

"(Meth)" indicates that the methyl-containing or methyl substituted compound is included in the term. For example, the term "ethylene-glycidyl(meth)acrylate" includes ethylene-glycidyl acrylate (E-GA) and ethylene-glycidyl methacrylate (E-GMA), individually and collectively.

"Melting Point" as used here is typically measured by the DSC technique for measuring the melting peaks of polyolefins as described in U.S. Pat. No. 5,783,638. It should be noted that many blends comprising two or more polyolefins will have more than one melting peak; many individual polyolefins will comprise only one melting peak.

"Layer" means a single thickness, coating or stratum generally continuously covering a surface or otherwise located within a laminate structure.

"Multi-layer" means at least two layers.

"Facial surface" and like terms refer to the two major surfaces of the layers that are either an exterior or outer-facing surface of the film or are in contact with the opposite and adjacent surfaces of the adjoining layers in a laminate structure. Facial surfaces are in distinction to edge surfaces. A layer that is generally rectangular comprises two facial surfaces and four edge surfaces. A generally circular layer comprises two facial surfaces and one continuous edge surface.

Layers that are in "adhering contact" and "tightly adhered" (and like terms), means that facial surfaces of two different layers in a laminate structure are in touching and binding contact to one another such that one layer cannot be removed from the other layer during stripping at the Controlled Bond Layer, and also preferably, cannot be separated or removed from each other without damage to the in-contact facial surfaces of one or both layers.

As herein defined, the term "strippably adhered" means a bond or adhesion between the facial surfaces of two layers which is capable of withstanding delamination under conditions of normal use but which will strip apart or otherwise separate prior to delamination at the facial surfaces of the other tightly adhered layers in a laminate structure.

"Adhesive strengths" (also referred to as the bond strength or the peel strength) of adhesive films, after bonding to the metal layer, to the outer plastic jacketing material were determined according to the following "Adhesion Test Method". An eight inch wide by six inch long by seventy five mil thick (203 mm×152 mm×1.9 mm) molding of a plastic jacketing material was prepared using a procedure similar to that described in Rural Electricification Administration (REA) Specification PE-200. A sheet of shielding tape (adhesive film laminated to the metal layer) of the same dimensions was placed over the molding. A polyester film of 3 mil (0.08 mm) thickness was placed between the shielding tape and the molding of the jacketing material to prevent bonding to one end and thus form a "tab" for use in a tensile testing machine. The shielding tape was bonded to the plastic jacketing material molding using a compression molding press and a molding temperature of 320° F. (160° C.) and a pressure of 5 tons force for 2.5 minutes. The mold was then placed in the cold side of the platen press at 60° F. (16° C.) at a pressure of 5 tons force for 2.5 minutes. The plaque was allowed to equilibrate at room temperature for at least one hour before proceeding. After the shielding tape/jacketing material laminate was prepared, one inch (2.5 cm) wide samples for bond tests were cut on a sample cutter. The samples were placed on a tensile testing machine and tested for bond strength as follows: the unbonded portion of the shielding tape was folded back 180°; the sample was inserted into the tensile testing machine with the shielding tape in the upper jaw and the molding of jacketing material in the lower jaw; a rigid metal plate was placed behind the molding to maintain the peeling angle at 180°; and the coated shielding tape was then separated from the rigid molding at a crosshead speed of 2 inches (50.8 mm) per minute. The required force to separate the shielding tape from the molding was recorded as a measure of adhesive strength in foot pounds per inch width (lbf/in width), the SI equivalent being newtons per mm width ("N/mm width").

As used herein, "coextrusion," and "coextrude," refer to the process of extruding two or more materials through a single die with two or more orifices into the die arranged so that the extrudates merge and weld together into a laminar structure before cooling or chilling, that is, quenching. Coextrusion is often employed as an aspect of other processes, for instance, in blown film and cast film processes.

Adhesion Layers (AL1 and AL2)

The films according to the present invention comprise two Adhesion Layers which can be the same or different depending upon the substrates that need to be adhered or joined by the adhesive film.

Adhesive polymer components for use in one or both Adhesion Layers include the adhesive polar ethylene copolymers, such as:
(a) ethylene/α,β-ethylenically unsaturated carboxylic acid copolymers,
(b) ethylene vinyl acetate ("EVA") copolymers,
(c) ethylene alkyl(meth)acrylate copolymers and
(d) blends of two or more of these.

Ethylene/α,β-ethylenically Unsaturated Carboxylic Acid Copolymers

In general these adhesive polymer components are copolymers of ethylene and ethylenically unsaturated carboxylic acids (including mono- and poly-basic acids, acid anhydrides, and partial esters of polybasic acids) such as acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, ethylene glycol monophenyl ether acid maleate, etc. The carboxylic acid monomer is preferably selected from α,β-ethylenically unsaturated mono-and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consist essentially of ethylene and one or more of such ethylenically unsaturated acid comonomers or can also contain small amounts of other monomers copolymerizable with ethylene. Thus, the copolymer can contain other copolymerizable monomers including an ester of acrylic acid. The comonomers can be combined in the copolymer in any way, e.g., as random copolymers, as block or sequential copolymers, or as graft copolymers.

Suitable ethylene/α,β-ethylenically unsaturated carboxylic acid copolymers include ethylene/acrylic acid (EAA) copolymers and ethylene/methacrylic acid (EMAA) copolymers with EAA copolymers being especially preferred. These copolymers have an α,β-ethylenically unsaturated carboxylic acid content, based upon copolymer weight, that is generally in the range of from at least about 1 weight percent ("wt %") up to and including about 22 wt %, with the lower limit being preferably at least about 3, more preferably at least about 4 and more preferably at least about 5 wt %; and the upper limit being preferably less than or equal to about 15 wt %, more preferably less than or equal to about 12 wt %, and most preferably less than or equal to about 10 wt %. It is noted that the ranges bounded by each and every lower limit and each and every upper limit are hereby specifically disclosed. If desired, two or more copolymers having different acid comonomer contents may be blended to provide a desired final acid comonomer content. It has been found that lower acid comonomer content, for example of less than about 1 wt %, tends to have inadequate adhesive properties and a higher melting point which may make the product more difficult to apply and would likely have poorer peel strength at low temperatures. On the other hand, higher acid comonomer content of greater than about 22 wt % is generally not available commercially. The Dow Chemical Company produces and sells EAA copolymers with acrylic acid (AA) contents of from 5 wt % to 20.5 wt % as well as EAA copolymer blends under the trade designation PRIMACOR™. NUCREL™ brand resins are sold by DuPont and are copolymers of ethylene and methacrylic acid or acrylic acid generally comprising from about 4 to 15 wt % acid comonomer.

Ethylene Vinyl Acetate ("EVA") Copolymers

In the suitable EVA copolymer(s) the ratio of units derived from ethylene to units derived from vinyl acetate in the copolymer can vary widely, but typically the EVA copolymer contains at least about 1, preferably at least about 2, more preferably at least about 4 and even more preferably at least about 6, wt % units derived from vinyl acetate. Typically, the EVA copolymer contains less than about 33 wt % units derived from vinyl acetate, preferably less than about 30, preferably less than about 25, preferably less than about 22, preferably less than about 18 and more preferably less than about 15 wt % units derived from vinyl acetate. The EVA copolymer can be made by any process including emulsion, solution and high-pressure polymerization. The EVA copolymer typically has a density of less than about 0.95, preferably less than about 0.945, more preferably less than about 0.94, g/cc. The same EVA copolymer typically has a density greater than about 0.9, preferably greater than 0.92, and more preferably greater than about 0.925, g/cc. Density is measured by the procedure of ASTM D-792. Blends of multiple EVA copolymers are also suitable.

Ethylene alkyl(meth)acrylate Copolymers

Among the suitable ethylene alkyl(meth)acrylate copolymers are following copolymers: ethylene ethyl acrylate (EEA), ethylene methyl acrylate (EMA) copolymers, ethylene methyl methacrylate (EMMA), ethylene methacrylate ethylene/butyl acrylate copolymers and 2-ethylhexyl acrylate copolymers (including blends of these). The ratio of units derived from ethylene to units derived from alkyl (meth)acrylate in the copolymer, before grafting or other modification, can vary widely, but typically the EEA or EMA copolymer contains at least about 1, preferably at least about 2, more preferably at least about 4 and even more preferably at least about 6, wt % units derived from the ethyl acrylate or methyl acrylate. Typically, the EEA or EMA copolymer contains less than about 28, preferably less than about 25, more preferably less than 22, and more preferably less than about 19, wt % units derived from ethyl acrylate or methyl acrylate. The ethylene/alkyl acrylate copolymer has a Vicat point or Vicat softening point temperature of no more than 40° centigrade (° C.). Determine Vicat point according to American Society for Testing and Materials (ASTM) test method D1525. The amount of alkyl acrylate that will yield such a Vicat point varies depending upon the alkyl acrylate. The alkyl acrylate is preferably selected from the group consisting of methyl acrylate, butyl acrylate and 2-ethylhexyl acrylate. Preferred alkyl acrylate contents, based on copolymer weight, range from: 26 to 31 percent by weight (wt %) methyl acrylate, 33 to 37 wt % butyl acrylate and 34 to 38 wt % 2-ethylhexyl acrylate. With alkyl acrylate amounts lower than the above contents, the copolymers tend to be more crystalline and have Vicat points in excess of 40° C. With alkyl acrylate amounts greater than the above contents, the copolymers tend to become liquid and lose their solid character. Arkema produces and sells ethylene/butyl acrylate and ethylene/methyl acrylate copolymers under the trade designation LOTRYL™ and 2-ethylhexyl acrylate copolymers under the trade designation (LOTRYL EH™)

Also suitable for use as an Adhesion layer are blends of two or more of these polymers, such as blends of EAA and EMA and blends of EAA and EMMA.

These adhesive polar ethylene copolymers or blends typically have a melt index (MI as measured by the procedure of ASTM D-1238 (190C/2.16kg) of less than 100, preferably less than 75, more preferably less than 50 and even more preferably less than 30, g/10 min. The typical minimum MI is at least about 0.3, more preferably 0.7, and more preferably it is at least about 1 g/10 min.

The Adhesion layer may also comprise an additional amount of one or more of the following: antiblock additives, antioxidants, colorants and process aids.

It has been found to be cost-effective for the Adhesion Layer to contain an amount of a miscible polyolefin resins, preferably a polyethylene, more preferably a low density polyethylene (LDPE), that is a polyethylene having a density of from 0.91 to 0.94 grams per cubic centimeter ("g/cm3"), preferably to 0.93 g/cm3, produced using radicals, for instance from oxygen or peroxide catalysts, at high pressure. Suitable low density polyethylenes are commercially available, for instance LDPE commercially available from The Dow Chemical Company under the trade designations 681i, 662i and 5004i.

Preferably, the polar adhesive ethylene copolymer(s) in the adhesion layer(s) is cost-effectively a blend that comprises at least 2 weight percent LDPE, preferably at least 3, and more preferably at least 4 weight percent LDPE based on the weight of the LDPE plus the polar adhesive ethylene copolymer(s). In general, when a blend is used, the LDPE content in the adhesion layer adhesive ethylene copolymer is less than or equal to 25 weight percent LDPE based on the polymer weight, preferably less than or equal to 20, more preferably less than or equal to 15 and most preferably less than or equal to 12 weight percent LDPE based on the weight of the LDPE plus the polar adhesive ethylene copolymer(s).

Usually, at least one of the Adhesion layers at the film surface needs to bond under heating conditions and tightly adhere to a metal/metallic substrate surface that is often employed as a layer around the conductive member in cable shielding structures. The metals and metal surfaces employed in cable shielding structures where Adhesion Layer heat activated bonding is frequently employed include steels and coated steels such as stainless steels, tin-free steel, tin-plated steel, copper-clad stainless steel, and electrolytically chrome coated steel (ECCS); aluminum; copper; bronze; and the like.

When an Adhesive Layer surface is applied to a metallic substrate layer, the other Adhesion Layer of the adhesive films according to the invention (which can be the same or different) provides sufficient adhesion to the outer coating or jacketing material that is needed to provide integrity during production, installation and use conditions. Then, after a stripping process that peels or strips the outer cable coating or jacketing material and film away at the Controlled Bond Layer, the metal-adhered Adhesion Layer needs to have sufficient adhesion to the metal to keep at least the layer of Adhesion Layer material adhered to the metallic substrate for corrosion protection. When measured, the bond strength between the metal-contacting Adhesion Layer and a metal substrate is generally characterized by a peel or adhesive strength of at least about 20 lbf/in width (3.5 N/mm width) as measured by the "Adhesion Test Method" described in more detail above.

In general, ethylene/$\alpha,\beta$-ethylenically unsaturated carboxylic acid copolymers as discussed above provide preferred metal-contacting adhesion layers in the films according to the present invention. Preferably employed as metal-contacting adhesion layer compositions comprise EAA, LDPE, antioxidant and anti-blocking concentrates, and pigments if needed.

The films according to the present invention are typically employed, as discussed above, in a cable shielding structure between an outer, protective cable coating or jacketing layer (typically a tough thermoplastic polymer) and the metal-shielded or metal-wrapped conductive member. They are required to provide sufficient adhesion to retain integrity of the structure during production, installation and use conditions and, during stripping at the controlled bond layer that is needed to access the metallic layer, retain adhesion to the outer jacketing layer and between the rest of the film layers. As known to practitioners in this field, the relevant layer for adhesion to the outer protective cable coating layer can be formulated from one or more of the adhesive polar ethylene copolymers to provide the needed adhesion with the particular outer jacketing layer that is employed. When measured, the bond strength between the jacketing layer-contacting Adhesion Layer and a jacketing layer is generally characterized by a peel or adhesive strength of at least about 20 lbf/in width (3.5 N/mm width) as measured by the Adhesion Test Method.

The protective cable coating layers that can are typically employed include: high density polyethylene ("HDPE", density than 0.93 g/cm3) polypropylenes (PP), medium density polyethylenes ("MDPE"; density 0.920-0.930 g/cm3), nylons, including blends comprising 1 or more of these with each other or other polymers. In general, preferred adhesion layers for these types of protective cable coating layers include the ethylene/$\alpha,\beta$-ethylenically unsaturated carboxylic acid copolymers as discussed above provide in the films according to the present invention. Preferably employed as such are adhesion layer compositions that comprise EAA, LDPE, antioxidant and anti-blocking concentrates, and pigments if needed, as also discussed above for use as metal-contacting adhesion layers.

Controlled Bond Layer ("CBL")—Propylene-Based Polymer Blends

The purpose for this layer is to provide strength and toughness in the film but having a surface that is consistently less adherent to and strippable from the Adhesion Layer 1 adhesive formulation (that is simultaneously needed to bond firmly and completely to a metallic layer). The polymers for use in this layer are commonly referred to as propylene-based polymers, propylene polymers or polypropylenes, including e.g., polypropylene or propylene copolymers comprising a majority of units derived from propylene and a minority of units derived from another $\alpha$-olefin (including ethylene). These propylene-based polymers include polypropylene homopolymer, copolymers of propylene and one or more other olefin monomers, a blend of two or more homopolymers or two or more copolymers, and a blend of one or more homopolymer with one or more copolymer, as long as it has a melting point of 125° C. or more. The polypropylene-based polymers can vary widely in form and include, for example, substantially isotactic propylene homopolymer, random propylene copolymers, and graft or block propylene copolymers.

The propylene copolymers preferably comprise at least 85, more preferably at least 87 and even more preferably at least 90, mole percent units derived from propylene. The remainder of the units in the propylene copolymer is derived from units of at least one α-olefin having up to about 20, preferably up to 12 and more preferably up to 8, carbon atoms. The α-olefin is preferably a $C_{3-20}$ linear, branched or cyclic α-olefin as described above.

In general, preferred propylene polymers include homopolymer polypropylenes, preferably high crystallinity polypropylene such as high stiffness and toughness polypropylenes. Preferably the propylene polymer MFR (measured in dg/min at 230° C./2.16kg,) is at least about 0.5, preferably at least about 1.5, and more preferably at least about 2.5 dg/min and less than or equal to about 25, preferably less than or equal to about 20, and most preferably less than or equal to about 18 dg/min.

The following are illustrative but non-limiting propylene polymers that can be used in the Controlled Bond Layer of this invention: a propylene impact copolymer including but not limited to DOW Polypropylene T702-12N; a propylene homopolymer including but not limited to DOW Polypropylene H502-25RZ; and a propylene random copolymer including but not limited to DOW Polypropylene R751-12N. Other polypropylenes include some of the VERSIFY® polymers available from The Dow Chemical Company, the VISTAMAXX® polymers available from ExxonMobil Chemical Company, and the PRO-FAX polymers available from Lyondell Basell Industries, e.g., PROFAX™ SR-256M, which is a clarified propylene copolymer with a density of 0.90 g/cc and a MFR of 2 g/10 min, PROFAX™ 8623, which is an impact propylene copolymer with a density of 0.90 g/cc and a MFR of 1.5 g/10 min. Still other propylene polymers include CATALLOY™ in-reactor blends of polypropylene (homo- or copolymer) with one or more of propylene-ethylene or ethylene-propylene copolymer (all available from Basell, Elkton, Md.), Shell's KF 6100 propylene homopolymer; Solvay's KS 4005 propylene copolymer; and Solvay's KS 300 propylene terpolymer. Furthermore, INSPIRE™ D114, which is a branched impact copolymer polypropylene with a melt flow rate (MFR) of 0.5 dg/min (230° C./2.16 kg) and a melting point of 164° C. would be a suitable polypropylene. In general, suitable high crystallinity polypropylene with high stiffness and toughness include but are not limited to INSPIRE™ 404 with an MFR of 3 dg/min, and INSPIRE™ D118.01 with a melt flow rate of 8.0 dg/min (230° C./2.16 kg), (both also available from The Dow Chemical Company).

Since it is known that it is very difficult to find any adhesive that will adhere to homopolymer or copolymer polypropylene, polymer blends are used to adjust the adhesion/strippability between the Controlled Bond Layer and Adhesion Layer 1. As needed for the selected adhesive material(s) used, the polypropylene polymers as described are blended or diluted with one or more other polymers, including polyolefins as described below, to the extent that the other polymer is (i) miscible or compatible with the polypropylene, and (ii) has little, if any, deleterious impact on the other desired properties of the polypropylene, e.g., toughness and modulus. Preferably, the propylene polymer blends for the Controlled Bond Layer comprise an amount of a linear ethylene-based polymers. Suitable linear ethylene-based polymers include those with densities less than 0.92 and is preferably an Ultra Low Density Linear Polyethylene Copolymer (ULDLPE) such as include ATTANE™ brand polyethylene resin, linear low density polyethylenes (LLDPE's) such as DOWLEX™ brand resins, metallocene (or post-metallocene) polymers. For example, it is suitable to use ethylene octene plastomers such as AFFINITY PL 1880G, PL8100G, and PL 1850G available from The Dow Chemical Company.

Suitable propylene-based polymer blends comprise the propylene-based polymer in the amounts of at least 30, preferably at least 35, more preferably at least 40 weight percent of the blend. Suitable blends contain a maximum propylene-based polymer amount of less than or equal to 80, preferably less than 70 and more preferably less than or equal to 60 weight percent of the blend.

Other additives that could be used with the propylene polymer s are inorganic fillers such as talc (including epoxy coated talc), colorants, flame retardants (halogenated and non-halogenated) and flame retardant synergists such as $Sb_2O_3$. However, care must be taken to avoid the inclusion of components such as film recycle that increase the adhesion of the Controlled Bond Layer with Adhesion Layer 1.

An important feature of the controlled peel adhesive film according to the invention is providing outer cable jacket "strippability". As defined above, the term "strippable" or "strippably adhered" means a bond or adhesion between the facial surfaces of two layers which is capable of withstanding delamination under conditions of normal use but which will strip apart or otherwise separate prior to delamination at the facial surfaces of the other tightly adhered layers in a laminate structure. The "stripping" (peeling and removal) of the outer cable jacketing from the inner, metal-wrapped conductive member is preferably comfortably performed or performable by hand or arm force, which corresponds to having a peel strength or bond strength on the order of less than 13 lbf/in width (2.28_N/mm width), preferably less than 12, and most preferably less than 11 lbf/in width (1.93_N/mm width). This is achieved by having the films according to the invention demonstrate somewhat weaker interlayer bond strength between two of its layers, in this case, at or near the CBL interface, when AL1 and AL2 are tightly adhered to opposing substrate surfaces that are being "peeled" apart. Desirably, all of the other interlayer bond strengths in the films according to the present invention (and the internal physical strength of the layers themselves) are greater than the peel strength measured at interface between the CBL and the adjacent layer (that is not the SBL), preferably are at least 7 lbf/in width (1.23_N/mm width), preferably at least 8, and more preferably are at least about 9 lbf/in width (1.57_N/mm width).

Strong Bond Layer ("SBL")—Ethylene Polymers

The SBL according to the present invention is selected to be adhered firmly between and to the adjacent facial surfaces of the Controlled Bond Layer and either optional Filler Layer(s) or Adhesion Layer 2 in production of the film according to the invention. A variety of materials provide the necessary combination of physical and adhesion properties including a generally wide range of thermoplastic ethylene-based polymers having a density less than about 0.92 g/cm3. These include the high pressure, free-radical low density polyethylene (LDPE), and heterogeneous linear low density polyethylene (LLDPE), ultra low density polyethylene (ULDPE), and very low density polyethylene (VLDPE), as well as multiple-reactor ethylenic polymers ("in reactor" blends of Ziegler-Natta PE and metallocene PE, such as products disclosed in U.S. Pat. No. 6,545,088 (Kolthammer et al.); U.S. Pat. No. 6,538,070 (Cardwell et al.); U.S. Pat. No. 6,566,446 (Parikh et al.); U.S. Pat. No. 5,844,045 (Kolthammer et al.); U.S. Pat. No. 5,869,575 (Kolthammer et al.); and U.S. Pat. No. 6,448,341 (Kolthammer et al.)). Commercial examples of a preferred linear ethylene-based polymers include ATTANE™ Ultra Low Density Linear Polyethylene Copolymer, DOWLEX™ polyethylenes, and FLEXOMER™ Very Low Density Polyethylene, all available from The Dow Chemical Company. Homogeneous olefin-based polymers such as ethylene-based plastomers or elastomers can also be useful as components in blends or compounds made with the ethylenic polymers of this invention. Commercial examples of homogeneous metallocene-catalyzed, ethylene-based plastomers or elastomers include AFFINITY™ polyolefin plastomers and ENGAGE™ polyolefin elastomers, both available from The Dow Chemical Company, and commercial examples of homogeneous propylene-based plastomers and elastomers include VERSIFY™ performance polymers, available from The Dow Chemical Company, and VISTAMAX™ polymers available from ExxonMobil Chemical Company. Ultra Low Density Linear Polyethylene Copolymers are a particularly preferred ethylene polymers for use in the SBL, including particularly blends comprising at least about 20 weight percent, preferably at least about 40 weight percent, and less than or equal to 90 weight percent, preferably 70, and more preferably less than 60 weight percent.

One of the primary advantages of the film structures according to the present invention is their ability to consistently maintain their optimized balance of performance properties while they utilize the film recycle that will inevitably result. Previously, in otherwise similar prior adhesive films, recycle has been unusable or detrimentally affects the performance of those prior art adhesive films or structures used in this application. It has unexpectedly been found that film properties and performance in the films according to the present invention can be consistently maintained while incorporating the film recycle, containing amounts of the adhesive and other layers, in either the Strong Bond Layer or, as will be discussed below, in optional Filler Layer(s). As known to those practicing in this area, "recycle" originates from edge trim and other scrap in production of this specific film.

In general the films according to the present invention need to contain at least 3 weight percent recycle, preferably at least 5, and more preferably at least 8, more preferably at least 10 weight percent recycle and less than or equal to 40 weight percent, preferably 30 weight percent, more preferably less than or equal to 25 weight percent, and most preferably less than or equal to 20 weight percent which weight percentages are based on the total film weight. Preferably, the recycle is located in either the Strong Bond Layer or in one or more optional Filler Layer(s). Preferably there is no recycle in the Controlled Bond Layer since recycle in the Controlled Bond Layer deleteriously affects the consistency of the strippability, in many cases providing too much adhesion, depending upon make-up of the recycle and content in the layer.

Each of the layers independently optionally contains additives within the skill in the art such as antioxidants, UV stabilizers, white or other pigments, and the like. These additives are especially appropriate in the barrier layer where they may help protect the entire multilayer film and possibly the surface adhered thereto.

Optional Filler Layer ("FL")—Ethylene Polymers

As may be needed to provide the balance of any necessary film thickness and/or performance properties, one or more additional optional layers may be incorporated in the films according to the present invention. For example, where more economical formulation costs are desired in production of film that is required to be at least a certain thickness, a lower cost material layer can be formulated and incorporated to address this. In addition, as may be needed to accommodate some or all of the recycle, a layer can be formulated and employed in the films. Preferably, these layers can be formulated from any of the Ethylene Polymers discussed in connection with the SBL above. The selection of a Filler Layer material is based upon cost effectiveness together with sufficient adhesion to the adjacent layers, typically the SBL and typically an Adhesion Layer.

Film Layer Structure

The thickness of the films according to the present invention, while not particularly critical, can be chosen to control film manufacturing costs, or one or more physical or mechanical properties of the film. These types of films according to the present invention typically have a thickness of at least about 0.5 mil (0.013 millimeter ("mm")), preferably at least about 1.0 mil (0.025 mm) and more preferably at least about 1.5 mil (0.04 mm). The types of films according to the present invention, limited in thickness primarily by cost and usage in thin cable jacketing applications, typically have a thickness of less than or equal to about 15 mil (0.38 mm), preferably about 5 mil (0.13 mm) and more preferably less than or equal to about 3.0 mil (0.076 mm).

Individual layer thickness, while also not particularly critical, can similarly be chosen to control film manufacturing costs, or one or more physical or mechanical properties of the film. Components of the Adhesion Layers tend to have a higher raw material cost. This factor motivates the use of AL layers that function as an adhesive, yet are as thin as practical. Based upon total multilayer film thickness, the separate Adhesion Layers, independently and individually individually, as a percentage of the total film thickness, have a thickness that is generally at least about 5 percent, preferably at least about 10 percent and more preferably at least about 15 percent, and is generally less than or equal about 50 percent, preferably about 30, more preferably about 25, measured either as volume percent or as percent of total thickness, either of which result in substantially the same percentage.

Thickness of the other layers can be employed along the following lines, similarly based on volume percentage and can be adjusted to provide other potentially desirable physical properties such as curl, tensile properties, tear properties, or stiffness.

|  | Suitable | Preferred | More preferred |
| --- | --- | --- | --- |
| Controlled Bond Layer thickness | 5-50% | 5-30% | 5-20% |
| Strong Bond Layer thickness | 0-60% | 15-45% | 25-35% |
| Filler Layer thickness | 0-60% | 15-45% | 25-35% |

In each instance above, individual layer thicknesses are selected to provide a total of 100%. A particularly suitable structure includes roughly, based upon total multilayer film thickness, 20% AL1, 10% CBL, 36% SBL, 19% FL and 15% AL2, and, preferably layered in this sequential order.

A multilayer film according to the present invention desirably has at least 4, preferably at least 5 and most preferably all 6 of the following properties:

(a) an Ultimate Tensile Strength at break, MD of from about 20 to about 30 $N/mm^2$;

(b) an Ultimate Tensile Strength at break, TD of from about 15 to about 25 N/mm²;

(c) an Ultimate Elongation (Tensile Strain at Break), MD of from about 350 to about 500 percent;

(d) an Ultimate Elongation (Tensile Strain at Break), TD of from about 450 to about 600 percent;

(e) an Elmendorf Tear Strength, both MD and TD, independently, of from about 9 to about 20 g/μm; and (f) a 2% Secant Modulus, both MD and TD, independently, of from about 160 to about 190 N/mm2.

The general methods for the preparation of the films according to the present invention are generally known in the art and the equipment is generally commercially available. FILM EXTRUSION MANUAL, Process Materials, Properties, prepared by the Film Extrusion Committee of the Polymers, Laminations and Coatings Division, TAPPI, and edited by Thomas I. Butler and Earl W. Veazey, TAPPI Press, 1992, particularly in Chapter 3, discusses film extrusion processes, particularly blown film and cast film processes. The teachings of this manual indicate the skill in the art and are incorporated by reference herein to the maximum extent permitted by law. Both processes permit recycling of scrap film and edge trim to maximize use of polymer. Blown film production involves extruding molten polymer through an annular opening to form a hot tube of polymer. The tube is then cooled and collapsed into an envelope shape. By way of contrast, cast film is extruded through a flat die with a thin wide opening. The flat curtain of film is cooled rapidly and then sent on for further processing.

Extrusion provides an even, consistent flow of polymer melt to a forming die and uses, what may also be referred to as a screw pump that includes a constant diameter screw, to convey polymer from a feed port to a discharge end. By adding energy to the polymer in the form of shear and heat, one melts the polymer. Polymer compression occurs as extruder screw root diameter increases toward the discharge end.

In a blown film bubble process, a quantity of air is injected into the center of the hot tube of polymer to inflate it to a desired diameter. Prior to inflation, the tube has a typical thickness that ranges from 0.028 inch (0.7 millimeter (mm)) to over 0.1 inch (2.5 mm). After the inflated tube is cooled and collapsed into an envelope shape, it passes through a set of nip rolls before it is slit and wound up.

In the cast film process, extrudate from the die has a thickness that typically ranges from 0.01 inch (0.25 mm) to 0.025 inch (0.63 mm). In chill roll cast extrusion, the extrudate is cast directly onto a polished roll that is chilled via an internal cooling mechanism. An air knife may be used to ensure contact of the extrudate with the chill roll and provide additional cooling.

In addition to their use as controlled peel layers in cable coating structures, the multilayer film structures of the present invention have other utilities as the controlled peelable layer between the metallic and/or thermoplastic polymer material layers of other structures. Other applications and surfaces include and range from cellulosic material surfaces, such as paper or wood products, through painted surfaces, including painted or coated substrate surfaces, such as painted or coated metal of the types used for metal buildings. They find particular utility as a layer in a cable jacket structure comprising an inner metal layer and an outer jacketing layer.

The following examples illustrate, but do not in any way limit, the present invention. All parts and percentages are by weight unless otherwise stated. In addition, all amounts shown in the tables are based on weight of polymer contained in the respective compositions unless otherwise stated.

The following materials in Table 1 below were used as indicated in the other Tables below to make the experimental films. Where indicated the density in is given in grams per cubic centimeter (g/cc) as determined by ASTM D792; Melt Index is given in grams per 10 minutes (g/10 min) as determined at 190 degrees C. and 2.16 kg mass pursuant to ASTM D1238.

TABLE 1

Experimental Film Formulation Components

| Material | Supplier | Density (g/cc) | Melt Index (g/10 min) | Comment |
|---|---|---|---|---|
| LDPE 5004I | Dow | 0.924 | 1.0 | Low Density Polyethylene |
| LDPE 535I | Dow | 0.925 | 1.9 | Low Density Polyethylene |
| PRIMACOR ™3330F | Dow | 0.932 | 5.8 | Ethylene acrylic acid Copolymer; 6.5% AA |
| PP H110-02 | Dow | 0.9 | 2.6 | Polypropylene |
| ATTANE ™ 4201G | Dow | 0.912 | 1.0 | Ultra low density polyethylene |
| ATTANE ™ 4202 | Dow | 0.913 | 3.2 | Ultra low density polyethylene |
| AFFINITY ™ PF1140G | Dow | 0.897 | 1.6 | Metallocene ethylene polymer |
| AFFINITY ™ PF 1850G | Dow | 0.902 | 3.0 | Metallocene ethylene polymer |
| AO = Antioxidant concentrate | Ampacet | 0.944 | | Ethylene acrylic acid carrier resin |
| AB = Antiblock concentrate | Ampacet | 1.016 | | Polyethylene carrier resin |
| Ampacet 170916 Green Pigment | Ampacet | 0.996 | | Polyethylene carrier resin |

Several experimental films having the following general 6 layer structure AL1/CBL/SBL/FL/FL/AL2 (represented by the following diagram and not shown to scale) are produced by the process described below:

Extruder A - AL1
Extruder B - CBL
Extruder C - SBL
Extruder D1 - FL1
Extruder D2 - FL2
Extruder E - AL2

Films 1-4 having 6 layers and a target thickness of 2.0 mil (50 μm) are coextruded using a conventional upward blown film line equipped with a 22 in (55.9 cm) diameter die, four 7.5 cm (2.95 inch) extruders, one 5 cm (1.97 inch) and one 10 cm (3.94 inch) extruder. The film has a nominal ABCDDE structure as shown above. The polymers of Layers AL1 and AL2 are mixed in 7.5 cm extruders A and E. The polymers for CBL are fed by 7.5 cm extruder B. The SBL layer uses 10 cm extruder C to mix and incorporate recycle as shown. The optional filler layers FL1 and FL2 are fed by 5 cm extruder D1 and 7.5 cm extruder D2, respectively, where recycle is mixed into FL2. This combination of extruders allows control of relative thickness of layers while maintaining acceptable rates of film production.

The extruders feeding the layers are ramped for temperature as follows: AL1, SBL, FL1, FL2 and AL2—from 260° F. (127° C.) to 320° F. (160° C.); and CBL—from 300° F. (149° C.) to 340° F. (171° C.). The die zones are set at 340° F. (171° C.). This produces a 78 in (1.98 m) wide lay-flat bubble. When the edges are trimmed, two 36 inch film sheets are recovered.

The compositions and structures of the Experimental Films are shown in Table 2 below. The table indicates the relative thickness percentages of the layers and the resin (blend) formulation compositions of the layers. Experimental Film A is a comparative example generally representative of INTEGRAL™ 602 brand adhesive film, that is currently made and sold by The Dow Chemical Company for use in cable jacketing applications. This film generally contains about 12 weight % recycle based on film weight, incorporated as approximately about 20% of the controlled bond layer.

TABLE 2

Experimental Films

| Experimental Film | A | 1 | 2 | 3 | 4 |
|---|---|---|---|---|---|
| Film Thickness, mils | 2.2 | 2.1 | 2.3 | 2.2 | 2.4 |
| Film Recycle Content | 12 | 8 | 8 | 8 | 8 |
| Adhesive Layer 1 | 22% | 20% | 20% | 15% | 20% |
| PRIMACOR™3330 | 90.5 | 90.5 | 90.5 | 90.5 | 90.5 |
| LDPE 5004i | 5 | 5 | 5 | 5 | 5 |
| AO | 2.5 | 2.5 | 2.5 | 2.5 | 2.5 |
| AB | 2 | 2 | 2 | 2 | 2 |
| Ampacet 170916 green | 6 pph | 6 pph | 6 pph | 6 ppm | 6 pph |
| Controlled Bond Layer | 55% | 10% | 10% | 10% | 10% |
| PP H110-02 | 45 | 51 | 46 | 60 | 41 |
| ATTANE™ 4201G | 55 | 49 | 54 | 40 | 59 |
| Recycle | 20-25 | 0 | 0 | 0 | 0 |
| Strong Bond Layer | N/A | 36% | 36% | 33% | 36% |
| AFFINITY™ PF 1140 | | 60 | 60 | | 60 |
| AFFINITY™ PF 1850G | | | | 60 | |
| ATTANE™ 4201G | | 40 | 40 | | 40 |
| LDPE 535I | | | | 40 | |
| Recycle | | 13.5 | 13.5 | 14.5 | 13.5 |
| Optional Filler Layer | N/A | 4% | 4% | 6% | 4% |
| LDPE 535i | | 100 | 100 | 100 | 100 |
| Optional Filler Layer | N/A | 15% | 15% | 22% | 15% |
| LDPE 535i | | 100 | 100 | 100 | 100 |
| Recycle | | 15 | 15 | 11 | 15 |
| Adhesive Layer 2 | 23% | 15% | 15% | 15% | 15% |
| PRIMACOR™ 3330 | 90.5 | 90.5 | 90.5 | 90.5 | 90.5 |
| LDPE 5004i | 5 | 5 | 5 | 5 | 5 |
| AO | 2.5 | 2.5 | 2.5 | 2.5 | 2.5 |
| AB | 2 | 2 | 2 | 2 | 2 |
| Ampacet 170916 green | 6 pph | 6 pph | 6 pph | 6 ppm | 6 pph |

The procedures outlined in ASTM D882 were used to determine physical properties of several of these films including: Ultimate Tensile Strength (UTS) in terms of both psi and Newtons per square millimeter (N/mm2), Ultimate Elongation (UE) in terms of %, 2% Secant Modulus in terms of psi and N/mm2 ASTM D1922 was used to determine Elmendorf Tear Strength (ETS) in terms of g/mil (g/μm), in each case in both the machine direction (MD) and transverse direction (TD). The testing results are shown in Table 3 below:

TABLE 3

Experimental Film Physical Properties

| Experimental Film | A | 1 | 2 | 4 |
|---|---|---|---|---|
| Tensile Stress at Yield, MD, psi (N/mm²) | 1,890 (13.0) | 1,590 (11.0) | 1,570 (10.8) | 1,610 (11.1) |
| Tensile Stress at Yield, TD, psi (N/mm²) | 1,750 (12.1) | 1,560 (10.8) | 1,490 (10.3) | 1,510 (10.4) |
| Tensile Stress at Break, MD, psi (N/mm²) | 4,200 (29.0_) | 4,010 (27.6) | 3,640 (25.1) | 4,070 (28.1) |
| Tensile Stress at Break, TD, ps (N/mm²)i | 3,690 (25.4) | 3,250 (22.4) | 3,370 (23.2) | 3,360 (23.2) |
| Tensile Strain at Yield, MD, % | 16 | 15 | 17 | 17 |
| Tensile Strain at Yield, TD, % | 13 | 12 | 14 | 12 |
| Tensile Strain at Break, MD, % | 477 | 478 | 451 | 483 |
| Tensile Strain at Break, TD, % | 552 | 549 | 572 | 580 |
| Toughness, MD, psi (N/mm²) | 12,520 (86.3) | 11,970 (82.5) | 10,775 (74.3) | 12,170 (83.9) |
| Toughness, TD, psi (N/mm²) | 12,245 (84.4) | 10,605 (73.1) | 11,010 (75.9) | 11,230 (77.4) |
| 1% Secant Modulus MD, psi (N/mm²) | 39,060 (269.3) | 30,920 (213.2) | 30,410 (209.7) | 29,950 (206.5) |
| 2% Secant Modulus MD, psi (N/mm²) | 31,060 (214.2) | 25,400 (175.1) | 24,910 (171.7) | 24,700 (170.3) |
| 1% Secant Modulus TD, psi (N/mm²) | 38,730 (267.0) | 33,250 (229.3) | 33,120 (228.4) | 33,110 (228.3) |
| 2% Secant Modulus TD, psi (N/mm²) | 31,305 (215.8) | 26,810 (184.8) | 26,750 (184.4) | 26,970 (186.0) |
| Elmendorf Tear MD, g/mil (g/μm) | 318 (12.5) | 237 (9.3) | 247 (9.7) | 262 (10.3) |
| Elmendorf Tear TD, g/mil (g/μm) | 448 (17.6) | 478 (18.8) | 457 (18.0) | 504 (19.8) |

Films were used to prepare laminate structures and tested as described above for their adhesive strengths. As indicated in the table below, for some tests Layer AL2 was bonded to the metal (indicated as "AL2/Metal") which means that during and after peeling, AL2 and all or part of SBL and remain adhered to metal. For other laminate structures, Layer AL1 was bonded to the metal (indicated as "AL1/Metal") which means that during and after peeling, AL2 and all or part of SBL remain adhered to the jacketing layer and are removed, leaving AL1 adhered to the metal.

For Experimental Laminates C, I and II, they were tested both a day after they were produced (fresh) and then retested 10 days after they were produced (aged) to determine whether there was any effect from PP crystallization over time. The Peel Test results in the table below are given in foot pounds per inch width (lbf/in width) and the value in newtons per mm width ("N/mm width") is shown in parentheses.

TABLE 4

Experimental Film Peel Strengths

| | Experimental Laminates | | | | |
|---|---|---|---|---|---|
| | C | I | II | III | IV |
| Experimental Film | A | 1 | 2 | 3 | 4 |
| % Recycle in CBL | 20 | 0 | 0 | 0 | 0 |
| % Recycle in SBL | 0 | 13.5 | 13.5 | 14.5 | 13.5 |
| % Recycle in FL2 | 0 | 15 | 15 | 11 | 15 |
| % Recycle in Film | 12 | 8 | 8 | 8 | 8 |

TABLE 4-continued

Experimental Film Peel Strengths

| | Experimental Laminates | | | | |
|---|---|---|---|---|---|
| | C | I | II | III | IV |
| PP:PO in CBL | 45:55 | 51:49 | 46:54 | 60:40 | 41:59 |
| Load at Peak AL1/Metal | | | | 10.17 (1.78) | |
| Load at Peak AL2/Metal | 29 (5.1) | | | 12.6 (2.2) | |
| Avg Peel Fresh AL1/Metal | | 10.43 (1.8) | 12.1 (2.0) | 6.1 (1.1) | 13.2 (2.3) |
| Avg Peel fresh AL2/metal | 12.88 (2.3) | 7.26 (1.3) | 8.91 (1.6) | 6.4 (1.1) | 14.4 (2.5) |
| Avg peel aged AL1/metal | | 10.85 (1.9) | 12.45 (2.2) | | |
| Avg peel aged AL2/metal | 13.75 (2.4) | 8.02 (1.4) | 7.55 (1.3) | | |

As discussed above, for use cable jacket structure applications, preferred adhesive films do not comprise recycle in the CBL and provide peel strengths when using aged shielding tape of from 7 to 13 lbf/in width (1.2-2.3 N/mm width), preferably from 7 to 12, and most preferably from 8 to 11 lbf/in width (1.4-1.9 N/mm width).

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "105" includes at least from 104.5 to 105.49. Furthermore, all lists are inclusive of combinations of any two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. For instance, a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are listed or discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one or more parameters may be acceptable to achieve another desirable end.

The invention claimed is:

1. A coextruded multilayer adhesive film, comprising:
    an Adhesion Layer 1 ("AL1") comprising an ethylene-based polymer;
    an Adhesion Layer 2 ("AL2") comprising an ethylene-based polymer;
    a Controlled Bond Layer ("CBL") located between the AL1 and the AL2 and strippably adhered to the AL1, the CBL comprising a propylene-based polymer;
    a Strong Bond Layer ("SBL") located between the CBL and the AL2 and adhered to the CBL, the SBL comprising an ethylene-based polymer; and
    one or more Filler Layer(s) comprising an ethylene-based polymer and located between the AL1 and the AL2,
    wherein the bond strength between the CBL and the AL1 is less than the bond strengths of the AL1 and the AL2 to surfaces of a metal or a thermoplastic ethylene polymer and other bond strengths between other adjacent layers in the film, and
    wherein at least one of the SBL and the Filler Layer(s) comprises at least about three weight percent recycled film composition.

2. The multilayer film of claim 1, wherein the bond strength of at least one of the AL1 and the AL2 to chrome coated steel is at least 20 lbf/in width (3.5 N/mm).

3. The multilayer film of claim 1, wherein the bond strength of the CBL to an adjacent layer is from 8 to 10 lbf/in width (1.4-1.75 N/mm).

4. The multilayer film of claim 1, wherein the AL1 comprises at least 40 weight percent of an ethylene/α, β-ethylenically unsaturated carboxylic acid copolymer.

5. The multilayer film of claim 1, wherein the CBL comprises at least about 30 weight percent of a propylene-based polymer.

6. The multilayer film of claim 1, wherein the SBL comprises at least about 50 weight percent of an ethylene-based interpolymer.

7. The multilayer adhesive film according to claim 1, having a layer structure represented by ABCDE, where the layers are:
    A. the AL1;
    B. the CBL strippably adhered to the AL1;
    C. the SBL adhered to the CBL;
    D. optionally, at least one Filler Layer(s) located between the SBL and the AL2; and
    E. the AL2.

8. A laminate comprising a metal layer, the multilayer film of claim 7 and a thermoplastic ethylene polymer layer, wherein surface AL2 is directly adhered to the metal layer.

9. The multilayer film according to claim 1 or 7, comprising: from 15 to 25 volume percent of the AL1, from 5 to 15 volume percent of the CBL, from 30 to 40 volume percent of the SBL, from 15 to 25 volume percent of the Filler Layer(s), and from 10 to 20 volume percent of the AL2.

10. The multilayer film according to claim 4, wherein the ethylene/α, β-ethylenically unsaturated carboxylic acid copolymer is an ethylene/acrylic acid copolymer that has an acid comonomer content within a range of from 3 to 9 weight percent, based upon the copolymer weight.

11. A cable structure comprising:
    a core of at least one insulated conductive member;
    a metal sheet layer circumferentially surrounding the core;

the multilayer adhesive film according to claim 1 and circumferentially surrounding the metal sheet layer;

an outer thermoplastic ethylene polymer jacket layer circumferentially surrounding the adhesive multilayer film, wherein the multilayer adhesive film strippably adheres the outer thermoplastic ethylene polymer jacket layer to the metal sheet layer.

12. The cable structure according to claim 11, wherein the metal sheet is selected from the group consisting of electrolytically chrome coated steel, aluminum, copper, bronze, tin-free steel, tin-plate steel and copper-clad stainless steel.

* * * * *